C. KRONENBERG.
REVOLVING SEED SELECTOR.
APPLICATION FILED JAN. 24, 1917.
1,301,277.
Patented Apr. 22, 1919.
2 SHEETS—SHEET 1.
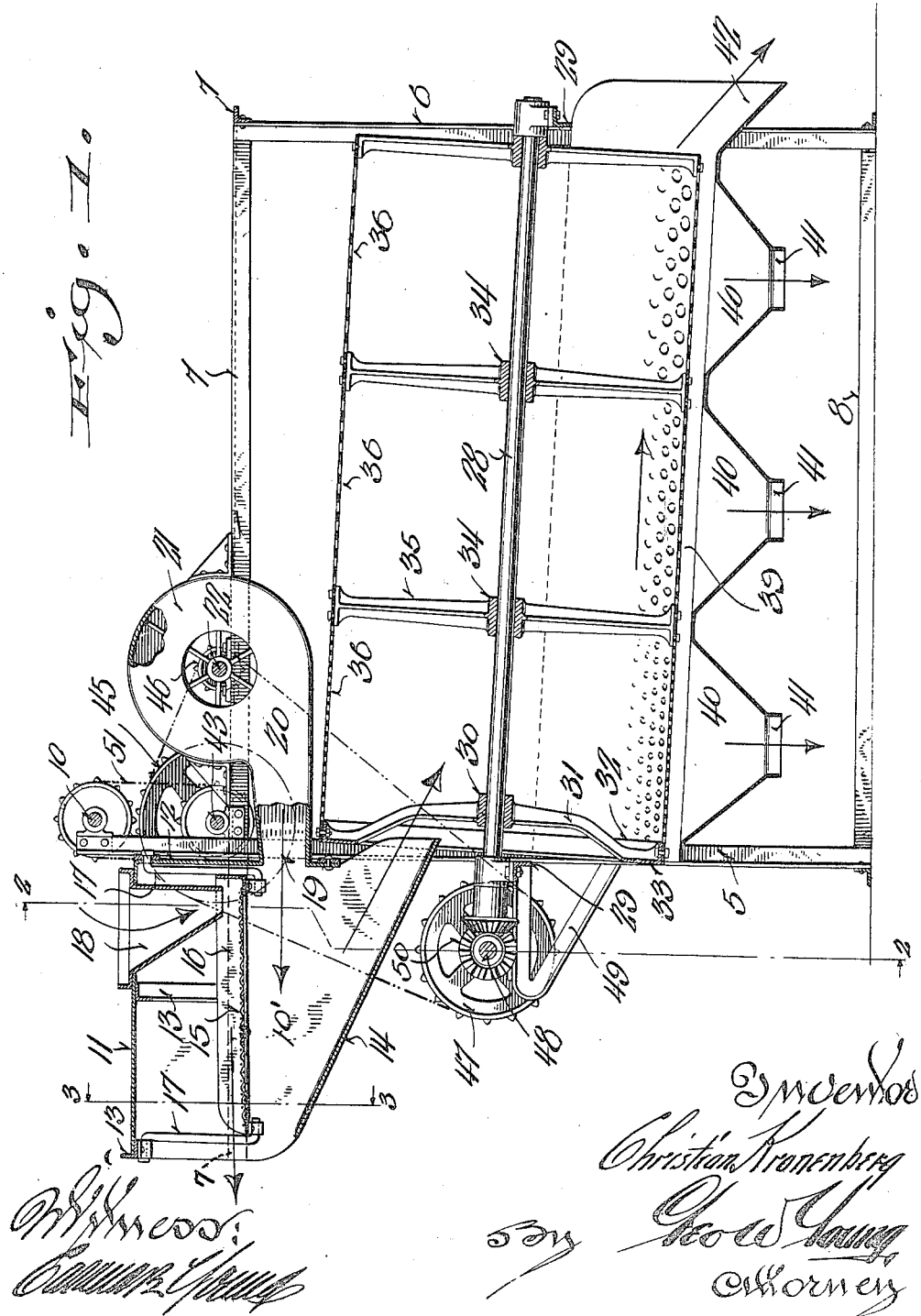

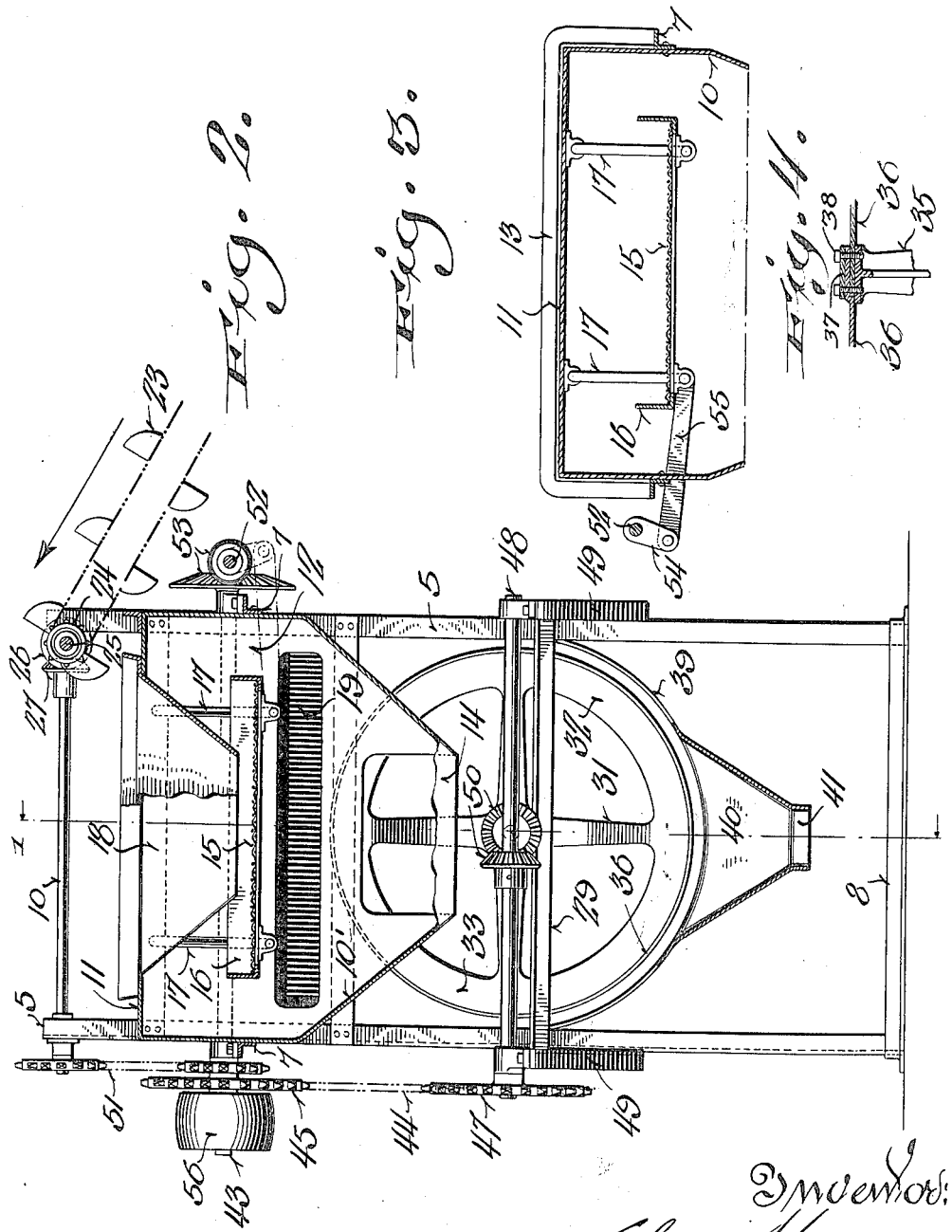

UNITED STATES PATENT OFFICE.

CHRISTIAN KRONENBERG, OF MADISON, WISCONSIN.

REVOLVING SEED-SELECTOR.

1,301,277.  Specification of Letters Patent.  Patented Apr. 22, 1919.

Application filed January 24, 1917. Serial No. 144,215.

*To all whom it may concern:*

Be it known that I, CHRISTIAN KRONENBERG, a citizen of the United States, and resident of Madison, in the county of Dane and State of Wisconsin, have invented certain new and useful Improvements in Revolving Seed-Selectors; and I do hereby declare that the following is a full, clear, and exact description thereof.

The present invention relates to new and useful improvements in apparatus for cleaning and selecting seed grain and other seeds.

The value of seeds depends largely upon the relative size thereof, and plump seed commands a considerable premium.

The main object of my invention is to provide a simple economical and effective machine for cleaning and screening seed and the problem to produce a machine of this character is therefore directed particularly to the building of the same and the assemblage of the several units in such manner that they can be constructed separately in different departments of a work-shop in an economical manner, and when these parts are brought together, they can be quickly put in place and also dismounted for shipment, whereby economy in space will result, and also the particular machine parts which would otherwise project beyond the field of the frame, can be housed within the skeleton frame, so that they will be more or less protected in shipment, as well as accomplishing the desired compactness.

With this object in view, particular attention is called to the fact that in building machines of the type referred to, the drum work is developed or constructed by a certain class of mechanics who are thoroughly familiar with it, and hence one department in the factory is devoted to this drum work. Another department in the factory is devoted to the skeleton construction of the frame, and still another department is devoted entirely to construction of the cleaning and screening apparatus which is incased in this instance, in a hood and is an integral unit, and after being completed is brought to the assembling room together with the frame and drum unit, it being understood that the frame is provided with suitable sill elements upon which is fitted and secured the cleaning unit, as will be more particularly described hereinafter.

The machine as a whole is designed so that larger seeds may be selected from the general run of seeds in a crop, to thus divide the seeds in various classes having different market value whereby the total value of the seed crop so selected may be considerably increased.

With the above and other objects and advantages in view, the invention resides more particularly in the novel combination, arrangement and formation of parts more particularly hereinafter described and particularly pointed out in the appended claim.

Figure 1 is a central vertical longitudinal section through a seed cleaning and selecting apparatus embodying one form of the present invention.

Fig. 2 is a transverse sectional view therethrough on the line 2—2 of Fig. 1.

Fig. 3 is a transverse sectional view through the cleaning hood on the line 3—3 of Fig. 1.

Fig. 4 is a detail view showing the means for detachably connecting the sections of the separating drum.

Referring now more particularly to the accompanying drawings, the frame work of the improved apparatus comprises front and rear corner uprights 5 and 6 respectively, and longitudinal and transverse upper and lower sills 7 and 8 for journally supporting a drive shaft 10 for a conveyer mechanism, hereinafter described.

For cleaning grain, a hood is provided at the forward end of the machine comprising side walls 10' carried by the extended forward ends of the upper longitudinal sills 7, a top wall 11 and an inner wall 12 the upper portion of the hood being supported by arched transverse sills 13 connected to the said extended sills 7. The hood is also provided with a bottom 14 inclined downwardly and inwardly and terminates in a mouth portion extended inwardly of the forward corner uprights 5, a grader screen 15 is carried by a U shaped frame 16 in the hood and this hood is provided with upstanding side and rear walls and is carried by pivotal hanger arms 17 depending from the upper portion of the casing in a manner permitting horizontal oscillatory movement of said frame. The frame and screen incline downwardly toward the open outer end of the hood, whereby vines disposed thereon will travel outwardly of said end of the hood. To supply seeds to the inner end of the screen 15, a chute 18 having an outwardly offset mouth portion is set within an opening in the inner portion of the top wall portion of the hood.

Thus upon feeding the seeds and contiguous plan portions through the chute 18 on to the screen and oscillating the screen, the plant portions will pass outwardly of the hood and the seeds will fall onto the inclined bottom 14 of the hood and will be discharged inwardly of said hood. For supplying an air blast to the seeds as they fall from the screen 15 the inner wall 12 is provided below the screen with a transverse passage 19 which communicates with a horizontally elongated air duct 20 of a blower fan 21 carried by the sills 7 inwardly of the hood this fan being driven by a shaft 22 journaled on said sills. This air blast removes the chaff and dust from the seeds and also removes particles of smut therefrom.

From the foregoing description with reference to the drawing, it is manifest that the mechanism embodying the cleaning and screening elements are all incased within a unitary structure described as a hood and fan casing which constitutes a part of the hood. Hence this unit after completion can readily be set in position at the feed end of the machine and is supported by the upper sill 7 and its extensions which project beyond the upright 5. It will be understood that the fan casing is provided with steering gears which fit and are secured to the sill 7, and that the transverse sill at the discharge end of the hood also serves as a support for the same; the down-turned ends of said sill as shown in Fig. 3, being adapted to rest upon the sill extension 7.

For feeding the seeds and plant portions to the chute 18 a laterally extending endless bucket conveyer 23 is provided, which is trained about a sprocket wheel 24 carried on a shaft 25 extending longitudinally of the machine and provided with a beveled gear 26 meshing with a similar beveled gear 27 on the drive shaft 10 heretofore mentioned.

The seeds are thus conveyed automatically to the apparatus and discharged from the hood in a thoroughly cleaned condition.

For selecting the different classes of seeds as they are here discharged from the hood, a selecting drum is provided which includes a shaft 28 extending longitudinally through the intermediate portion of the machine and journaled on transverse ends sills 29 thereof. Fixed to the forward end of the shaft is a hub 30 from which extends radial spider arms 31 carrying at their outer ends an annular band 32 provided with an inwardly turned retaining flange 33 and fixed on the shaft at spaced intervals are hubs 24 carrying radial spider arms 35. Disposed between and secured to the radial spider arms of each pair of adjacent hubs is a foraminous drum section 36, and the adjacent ends of these sections preferably overlap to preserve the continuity of the inner surface of the drum, and are further held in proper relation by bands 37 disposed about their lapped ends preferably by the bolts 38 which secure said sections to the outer arms. Thus the sections are adapted to permit desired substitution of different meshes, and the connection of the sections by means of the spider arms 35 does not interfere materially with the desired free flow of grain through the sections.

The sections are of successively coarser mesh toward the rear end of the drum, which is open to discharge the largest sizes of speed therefrom. The shaft 28 is inclined downwardly toward the rear end of the machine, consequently upon feeding seeds in the forward end of the drum said seeds gradually travel therethrough, and certain of the seeds will pass through the meshes of the sections according to their size and will be thus selected. For collecting the different classes of seeds a semicircular casing 39 is disposed under the drum and is provided under each section with depending hopper portions 40 having their walls inclined and terminating at their lower ends in a discharge throat 41, the rear end of the casing being extended outwardly of the frame and terminating in a discharge chute 42 from which is discharged the largest sizes of seeds.

The present drum is thus adapted to divide the seeds into four classes or grades, although it may in some instances be desired to provide a greater or lesser number of grades by varying the number of drum sections.

The present machine is adapted for selecting various kinds of seeds and I preferably provide a plurality of sets of different meshed drum sections each set being more particularly adapted for a certain type of seed.

Taking up the drive means of the various mechanism described, the main transverse drive shaft 43 is journaled at the upper forward corner of the drum and a sprocket chain 44 is trained about a sprocket wheel 45 of the shaft 43 and about a sprocket shaft wheel 46 on the fan blower shaft 22 and about a sprocket wheel 47 on the transverse shaft 48 carried by the brackets 49 at the forward end of the machine, which drives the drum shaft 28 through the medium of meshing beveled gears 50.

The conveyer drive shaft 10 is actuated by a direct sprocket connection 51 with the main drive shaft 43. For oscillating the screen frame 16 a shaft 52 extends forward of the main drive shaft 43, at one side of the machine and is driven therefrom by intermeshing beveled gears 53. This shaft 42 carries a depending rocker arm 54 to which is pivoted a link 55 pivoted also to the said screen frame 16. The main shaft 54 may be driven either manually or by engine power and in the present instance a drive pulley is shown thereon.

The entire apparatus is thus of a relatively simple and durable nature and is exceedingly efficient in operation.

While I have shown and described one form of the invention it is apparent that under differing conditions of use various modifications may be resorted to without departing from the spirit of the invention and therefore the scope of the present invention is to be limited only by the scope of the appended claim.

I claim:

In a screening and separating machine, the combination of a skeleton frame including corner uprights, upper sills connecting said uprights and extended past the uprights at one end of the frame, a separator member mounted within the frame between the uprights and connected with the uprights for support thereby, and a cleaner unit disposed between and supported by said extensions of the frame sills and including an inclosed hood having an air discharge opening at one end and a fan casing extension projecting from the other end thereof, the bottom of the hood being inwardly inclined to form a discharge mouth adapted to discharge toward the separator member.

In testimony that I claim the foregoing I have hereunto set my hand at Madison, in the county of Dane and State of Wisconsin, in the presence of two witnesses.

CHRIST KRONENBERG.

Witnesses:
A. L. NUSSBAUM,
J. C. SOMMERS.